Patented Nov. 10, 1942

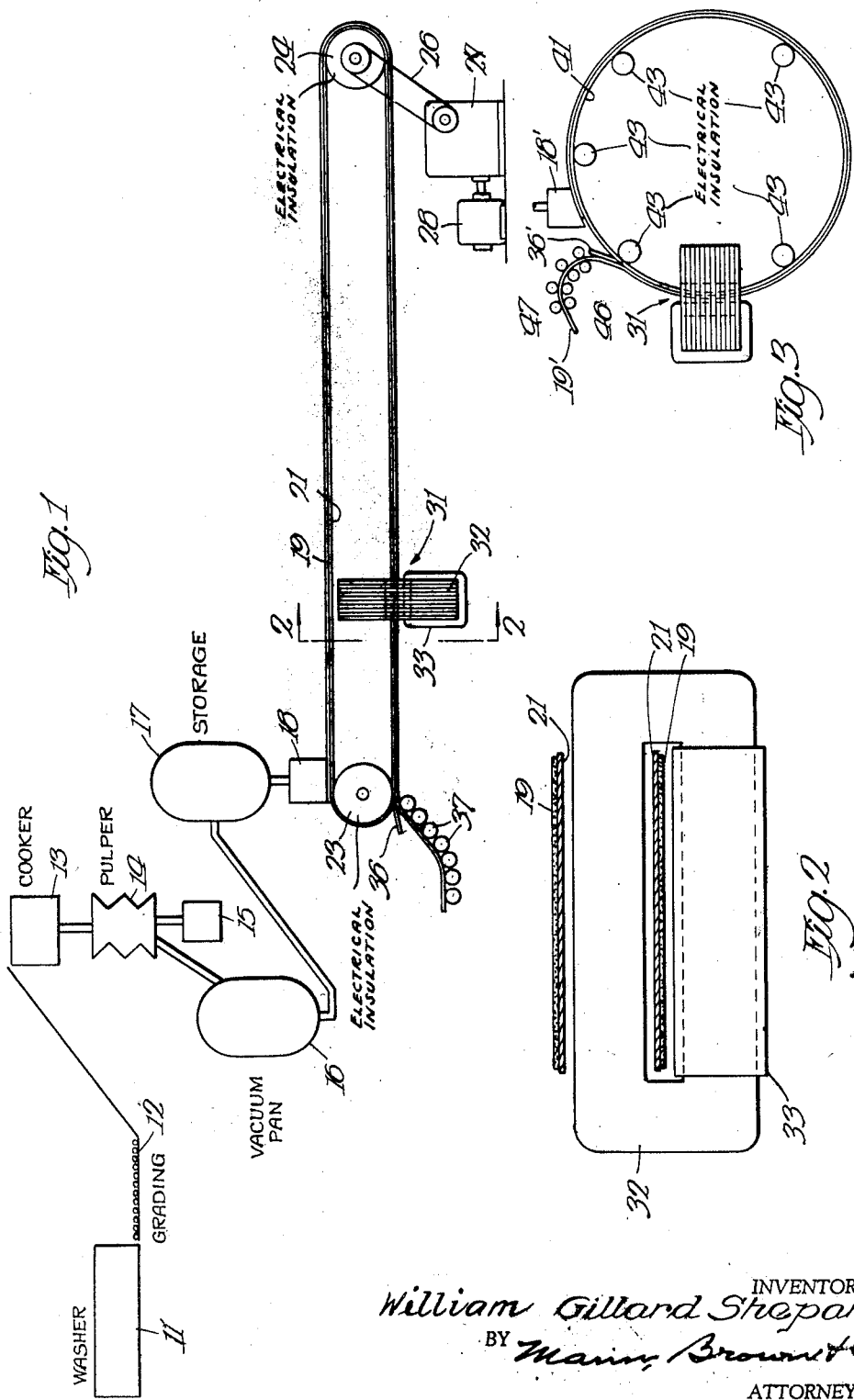

2,301,589

UNITED STATES PATENT OFFICE 2,301,589

DRYING OF FRUIT PULP

William Gillard Shepard, Chelan, Wash.

Application June 5, 1940, Serial No. 338,925

2 Claims. (Cl. 34—208)

This invention relates to the drying of fruit pulp or the like and particularly to the efficient application of heat thereto. Usually the heating of fruit pulp or the like for the purpose of drying the same involves inefficient heat transfer from some heating medium to the container or carrier for the substance being dried, which heat transfer is naturally attended by considerable heat loss.

According to the present invention, heat transfer from the heating medium to the container or carrier for the substance being dried is avoided by generating the heat directly in the carrier. This is accomplished by using a carrier, preferably in the form of an endless belt or cylinder, which is electrically conductive and which forms the secondary coil of a transformer. In other words, the core of the transformer extends around one reach of the carrier, and alternating magnetic fields induced in the core induce an alternating electrical current in the carrier. This current, of course, traverses the entire length of the carrier and hence heats the entire carrier uniformly. Since the substance being dried is in direct contact with the heating element, there is relatively little heat loss. The heat loss of course may be decreased by insulating the portions of the carrier which would otherwise be exposed to air.

Additional objects and advantages of the invention will be apparent from the following description and from the drawing, in which:

Fig. 1 is a diagrammatic illustration of one form of the invention.

Fig. 2 is a diagrammatic illustration representing a section taken approximately on the line 2—2 of Fig. 1.

Fig. 3 is a diagrammatic representation of a modified form of the invention.

Two forms of the invention have been chosen for illustration and description, in compliance with section 4888 of the Revised Statutes, but persons skilled in the art will readily perceive other means for accomplishing the same results, and the claims are therefore to be construed as broadly as possible, consistent with the prior art.

Both forms of the invention relate particularly to the drying of fruit pulp or analogous materials by means of what might for convenience be called a self-heated carrier. One form of the preferred preparation of the material to be dried is illustrated diagrammatically in Fig. 1. Fruit such as apples first goes through a washer 11, from which it passes onto a grading table 12. An attendant may visually select the apples suitable for this process and pass them on to the cooker 13. After the apples have been softened and cooked as much as desired in the cooker 13, they may pass to the pulper 14, which removes the inedible parts but leaves the food and flavor, the inedible parts collecting in receptacle 15. The pulp may now be pumped or drawn through pipes by suction, and it next passes to a vacuum pan 16, where it is reduced to about the consistency of apple butter. From the vacuum pan it may pass into a storage vat 17. From the storage vat 17 the material passes to a hopper 18 which applies the material in a thin layer 19 to the self-heated carrier 21. The hopper 18 preferably extends substantially all the way across the carrier 21 so as to apply the layer thereto for substantially the full width thereof. The hopper 18 is preferably adjustable to control the thickness of the layer 19.

The carrier 21 preferably comprises a continuous band of sheet metal of low electrical resistance. It may, for example, comprise a band of soft copper. It is carried between a head drum 23 and an end drum 24, one or both of which may be driven. In the illustration the drum 24 has been shown as driven by a chain 26 through a gear reduction unit 27 by a motor 28.

The carrier 21 is heated uniformly by induced currents flowing uniformly throughout the area thereof. This is accomplished by making the carrier 21 form a secondary coil of a transformer 31. Although it is a coil of a single turn and its voltage is therefore low, it is evident that its resistance is likewise low so that a heavy current will flow nevertheless.

The transformer 31 includes a core 32 which may be the conventional type of laminated core except for being elongated to extend around one reach of the carrier or belt 21 as seen best in Fig. 2, and perhaps having a relatively large cross-sectional area. A primary coil 33 is wound on the core 32, by which is meant that it surrounds a portion of the core, as clearly seen in Fig. 2. The elongated shape of the core 32 permits an electrical advantage in this coil in that all of its turns may be fairly close to the core and hence of a relatively short length, for a given core size, and correspondingly low resistance. This coil will, of course, be connected to a suitable source of power, such as 110 volt or 220 volt alternating current, and for purposes of control it may be connected through a variable resistance or other controlling unit.

According to the well known principles of transformers, alternating current flowing through the primary coil 33 will produce an alternating magnetism in the core 32. This magnetism will in turn induce an alternating voltage in the secondary coil, which in this instance is the single-turn conductive carrier 21. The voltage of the two coils is proportional to the number of turns therein. If coil 33 has 100 turns and the voltage impressed on it is 110 volts, the voltage induced in coil or carrier 21 will be approximately 1 volt. On the other hand, the amperage is approximately in inverse proportion to the number of turns and, accordingly, 500 amperes in the secondary coil or carrier 21 would correspond to only five amperes in the primary coil 33. Because of the relatively large cross section of the carrier belt 21 and because it is preferably formed of a low resistance metal, its total resistance is fairly low, depending of course on the length of the belt as well as its cross section, and, accordingly, a very small voltage induced in it will cause a very high current to flow. The heat developed is proportional to the square of the current, and, accordingly, a high current value is desirable.

Because the carrier 21 is heated by the currents induced therein instead of by heat transfer from some other heating device, it may be very appropriately spoken of as self-heating, and the heat losses attendant upon heat transfer from one device to another are avoided. In other words, the heat is generated within the carrier belt 21 which is as close as possible to the material 19 being heated or dried. Of course, some heat will be lost from the exposed portions of the belt 21, but such heat loss may be very effectively minimized by providing insulation either on the inner surface of the belt or along the sides of the drying unit. The transformer as a whole may be included within the insulation, in which case even a large portion of the heat generated in the transformer 31 may be conserved, if the transformer is designed for high temperature operation.

The carrier 21 will be driven at such speed that as the material thereon reaches the desired condition of dryness it will reach a scraper 36 and be scraped from the belt 21, in which case it may be carried away in any convenient manner. In the illustrated form of the invention it is assumed that the dried material will not be brittle and hence that it can be drawn off and carried by conveyor rolls 37 to a suitable point for cutting up and packing or otherwise treating.

It is preferred that the drums 23 and 24 either be formed of insulating material or be electrically insulated from the belt 21 so that they will not short-circuit the portion of the belt 21 in contact therewith. Thus, as the belt passes beyond the scraper 36, heat will continue to be generated therein, raising the temperature thereof so that when the cool material is deposited on the belt by the hopper 18, the excess heat in the belt 21 will take the chill out of the material 19 quite rapidly and raise it to a temperature at which rapid evaporation takes place.

If desired, the same belt may be used for two concurrent drying operations by scraping the dried material from the belt above the drum 24 and applying additional material to the inside of the belt just under the drum 24, this second supply of material being removed from the inside of the belt as it approaches drum 23. Of course, either the speed of the belt, the thickness of the layer 19, or the amount of moisture to be evaporated therefrom must be reduced or else the current flowing through the belt must be increased to provide sufficient drying on one reach of the belt.

In Fig. 3 is illustrated a form of the invention which avoids the necessity for flexing the metal belt around the drums 23 and 24. It should be observed that, for some purposes at least, a sheet metal belt is preferred to a woven and more flexible belt because of the fact that the material can be scraped very cleanly from the smooth sheet metal belt. Likewise, it should be recognized that the drums 23 and 24 may be of much larger diameter, relatively speaking, than illustrated so that the amount of flexing of the belt will be decreased. However, except in so far as the flexing causes deterioration of the belt or an objectionably high load on the driving mechanism, it is not objectionable because any resistance to flexing generates heat within the belt and thus increases the heating effect of the currents in the belt. Nevertheless, any objections as to flexing are completely removed by the structure of Fig. 3.

In this structure the carrier comprises a cylinder, diagrammatically illustrated at 41. The cylinder may be made rigid by means of suitable bracing or flanges, which, however, are preferably non-conductive electrically so as to force the electrical currents generated in the cylinder 41 to stay within the cylinder itself rather than to pass into any bracing or rigidifying structure where its heat will be less effective. The cylinder 41 may be suitably supported in any rotatable manner, as by rollers 43 which may be positioned, as shown, on the underside thereof near the top and at suitable other positions for adequately controlling the movement of the cylinder 41. Any or all of these rollers 43 may be driven for driving the cylinder 41. The transformer 31 is here shown surrounding a portion or reach of the cylinder 41 in the same manner as it surrounded the belt 21 in Figs. 1 and 2. In short, in both forms of the invention the transformer core and carrier are physically linked through one another so that the carrier forms a secondary of the transformer coil.

In Fig. 3 the hopper 18' will of course be designed appropriately for cooperation with the cylinder. The scraping blade 36' may be positioned quite close to the hopper, and conveying rollers 46 and 47 may be arranged to deflect the dried ribbon 19' which is scraped from the cylinder 41 and to carry it to any desired position.

It will be recognized that in speaking of dried material it is not meant to imply that it is necessarily completely dried but rather that it is reduced to at least a thick gummy consistency as distinguished from the consistency of ordinary jelly. Accordingly, it may be quite flexible.

There are other constructions in which the principle of self-heating may be utilized. For example, the one-turn secondary of the transformer may be in the form of a flat horizontal annular ring or a disc with the core extending down through the center thereof. Although the heating with this construction will not be as uniform as with the cylinder or belt, it has the possible advantage that the hopper and scraper can be moved around the disc instead of the disc moving with respect to the hopper and scraper. It is evident, of course, that relative movement of the carrier with respect to the other devices is all that is necessary. Another structure for accomplishing self-heating is a structure of substantially the same nature as that illustrated in Fig. 1 but omitting the transformer, conducting one lead to each of the drums 23 and 24, and making these drums of conductive material in contact with the belt 21 so that current flows through the two reaches of the belt 21. In this way heat will be generated with substantial uniformity throughout both of the reaches of the belt 21 and, as in the structure of Fig. 1, there will be no heat loss due to heat transfer from a separate heater to the belt 21.

Tests have shown that a thickness of product which requires from 15 to 20 minutes to concentrate by previous methods can be concentrated in from 6 to 10 minutes by this method. Moreover, the use of this method produces a lighter colored and better concentrate, assuming the steps prior to delivery by the hopper 18 to be the same, as the shorter time in drying reduces the time during which the heated pulp tends to oxidize.

The dried or concentrated pulp may be cut into sheets and packed in cases, and in this form it will keep in any climate. It does not attract insects or worms and has a minimum tendency to absorb moisture from the air.

From the foregoing it is seen that an exceptionally efficient and satisfactory apparatus and method are provided for drying fruit pulp and the like, in which the efficiency is obtained particularly by virtue of avoiding the heat loss attendant upon transfer of heat from a heating member to the carrier or container in contact with the fruit pulp. The heat is generated uniformly in the carrier itself and hence is immediately available to the pulp, thus reducing the drying time and improving the quality of the finished product. Of course, the self-heating heater comprising the transformer secondary may be used for other purposes than drying fruit or the like.

The present invention is an improvement on the various features of fruit drying described in Shepard Patent No. 1,257,410, Sartakoff Patent No. 1,908,489, and Stuntz Patent No. 2,155,453, all of which may be referred to for such further details as may be helpful to anyone practicing the present invention. It should be mentioned that there has been no attempt to make the diagrammatic figures proportional. It is probable, for example, that in the form of structure shown in Figs. 1 and 2 the core of the transformer would have nowhere near the thickness of the spacing between the two reaches of the belt. If a transformer of reasonable core cross-section were not sufficient to give the heating characteristics desired, considering the length and cross section of the belt as may be provided, it might be preferred to use two or more transformers rather than one transformer with an exceptionally heavy core.

I claim:

1. Heating apparatus comprising a transformer having a core forming a loop and primary winding wound on the core, and a secondary winding linked through the loop comprising a single turn having a length at least several times the periphery of a cross section of the core, and having a substantial cross section of a flat thin shape, being movable through the loop and adapted to convey the substance being heated, and means adapted to feed the substance to the secondary winding, move the secondary winding and scrape the substance from the secondary winding as it moves.

2. Drying apparatus including an endless electrically conductive element adapted to serve as a carrier for the material to be dried, means for driving the element, a transformer core linked through the element whereby the element surrounds one side of the core and continuously moves through the passage within the loop of the core, and a primary coil wound on the core whereby alternating current impressed on the primary coil induces alternating current in the endless conductive element forming a one-turn secondary of the transformer, said element comprising a smooth metallic member, means for applying the material to said element in a sheet-forming layer, and a scraper adapted to remove the dried material from said element.

W. GILLARD SHEPARD.